(12) United States Patent
Bean et al.

(10) Patent No.: US 8,301,475 B2
(45) Date of Patent: Oct. 30, 2012

(54) ORGANIZATIONAL BEHAVIOR MONITORING ANALYSIS AND INFLUENCE

(75) Inventors: Dan M. Bean, Woodinville, WA (US); Sameer D. Bedekar, Issaquah, WA (US); Ross F. Smith, East Sound, WA (US)

(73) Assignee: Microsoft Corporation, Redmond, WA (US)

(*) Notice: Subject to any disclaimer, the term of this patent is extended or adjusted under 35 U.S.C. 154(b) by 179 days.

(21) Appl. No.: 12/776,543

(22) Filed: May 10, 2010

(65) Prior Publication Data

US 2011/0276369 A1   Nov. 10, 2011

(51) Int. Cl.
*G06Q 10/00* (2012.01)
(52) U.S. Cl. .................................................... 705/7.11
(58) Field of Classification Search .................. 705/7.11, 705/7.42
See application file for complete search history.

(56) References Cited

U.S. PATENT DOCUMENTS

| | | | | |
|---|---|---|---|---|
| 5,577,169 A * | 11/1996 | Prezioso | ............................ | 706/52 |
| 5,692,215 A * | 11/1997 | Kutzik et al. | ..................... | 710/18 |
| 5,848,396 A * | 12/1998 | Gerace | ............................ | 705/7.33 |
| 5,905,436 A * | 5/1999 | Dwight et al. | .............. | 340/573.1 |
| 6,151,585 A * | 11/2000 | Altschuler et al. | ............ | 705/7.29 |
| 6,163,607 A * | 12/2000 | Bogart et al. | .............. | 379/266.01 |
| 6,914,975 B2 * | 7/2005 | Koehler et al. | ........... | 379/265.05 |
| 7,007,235 B1 | 2/2006 | Hussein et al. | | |
| 7,069,259 B2 * | 6/2006 | Horvitz et al. | .................... | 706/25 |
| 7,143,052 B2 * | 11/2006 | LaSalle et al. | ................ | 705/7.33 |
| 7,188,078 B2 * | 3/2007 | Arnett et al. | .................. | 705/7.31 |
| 7,367,808 B1 | 5/2008 | Frank et al. | | |
| 7,437,309 B2 * | 10/2008 | Magrino et al. | .............. | 705/7.14 |
| 7,577,246 B2 * | 8/2009 | Idan et al. | ................ | 379/265.01 |
| 7,644,057 B2 | 1/2010 | Nelken et al. | | |
| 7,822,631 B1 * | 10/2010 | Vander Mey et al. | ......... | 705/7.29 |
| 7,912,790 B2 * | 3/2011 | Albertsson | ..................... | 705/321 |
| 2003/0177027 A1 * | 9/2003 | DiMarco | ........................... | 705/1 |
| 2006/0116894 A1 * | 6/2006 | DiMarco | ........................... | 705/1 |
| 2006/0212931 A1 * | 9/2006 | Shull et al. | ...................... | 726/10 |
| 2007/0214097 A1 | 9/2007 | Parsons et al. | | |
| 2008/0005051 A1 | 1/2008 | Turner et al. | | |
| 2009/0063992 A1 * | 3/2009 | Gandhi et al. | ................. | 715/752 |
| 2009/0216626 A1 * | 8/2009 | Lund | ............................... | 705/11 |
| 2009/0327052 A1 | 12/2009 | Wong et al. | | |
| 2010/0042448 A1 | 2/2010 | Bess | | |
| 2010/0114672 A1 * | 5/2010 | Klaus et al. | ..................... | 705/11 |

OTHER PUBLICATIONS

Coen, Dan, Creating a dynamic performance development program Direct Marketing, vol. 64, No. 3, Jul. 2001.*
Grant, Rebecca A. et al., Computerized Performance Monitors as Multidimensional Systems: Derivation and Application ACM, Transactions of Information Systems, vol. 14, No. 2, Paril 1996.*
van den Broek, Diane, Monitoring and survelliance in call centres: some responses from Australian workers. Labour & Industry, vol. 12, No. 3, Apr. 2002.*
Gandhi, Shruti L. et al., Analyzing User Behavior in Instant Messaging Presentation at the Annual Conference of ITA, 2000.*
Smith, Ross, Using Microsoft Lync to Build Trust Microsoft, May 2010.*

(Continued)

*Primary Examiner* — Scott L Jarrett
(74) *Attorney, Agent, or Firm* — Turk IP Law, LLC

(57) ABSTRACT

Approaches are provided for monitoring, analyzing, and influencing organizational behaviors through multi-modal communication systems. Desired and undesired behaviors and applicable organizational contexts are defined and action plans developed. The behaviors are then monitored through communication sessions between members and analyzed for comparison to the action plans such that feedback may be provided at individual and/or organizational levels to influence the behaviors.

14 Claims, 8 Drawing Sheets

OTHER PUBLICATIONS

Blomqvist, Kirsimarja et al., Building Organizational Trust Proceedings of 16th Annual IMP Conference, 2000.*

Mayer, Roger C. et al., An Integrative Model of Organizational Trust The Academy of Management Review, vol. 20, No. 3, Jul. 1995.*

Bean, Dan et al., Trust Subversion Analysis Using Office Communicator to Build Organizational Trust Microsoft, Date Unknown.*

Golbeck, Jennifer et al., Reputation Network Analysis for Email Filtering CEAS 2004, 2004.*

Golbeck, Jennifer et al., Accuracy of Metrics for Inferring Trust and Reputation in Semantic Web-Based Social Networks EKAW 2004, 2004.*

Golbeck, Jennifer et al., Inferring Trust Relationships in Web-based Social networks ACM Transactions on Internet Technology, vol. 6, No. 5, Nov. 2006.*

Bos, Nathan et al., Effects of Four Mediated Communication Channels on Trust Development ACM, CHI'2002, 2002.*

Mann, Darrell., "Application of Triz Tools in a Non-technical Problem Context", Retrieved at << http://www.triz-journal.com/archives/2000/08/a/index.htm >>, 2000, pp. 18.

Blomqvist, et al., "Building Organizational Trust", Retrieved at << http://citeseerx.ist.psu.edu/viewdoc/download?doi=10.1.1.123.8168&rep=rep1&type=pdf , In Proceedings of 16th Annual IMP Conference, 2000, pp. 16.

Nefti, et al., "A Fuzzy Trust Model for E-commerce", Retrieved at << http://ieeexplore.ieee.org/stamp/stamp.jsp?tp=&arnumber=1524074&userType=inst >>, CEC, Proceedings of the Seventh IEEE International Conference on E-Commerce Technology, Jul. 19-22, 2005, pp. 4.

* cited by examiner

ORGANIZATIONAL BEHAVIOR MONITORING ANALYSIS AND INFLUENCE

BACKGROUND

Recent studies suggest that trust in an organization and its management ("organizational trust") is a highly valued determinant of job satisfaction. The satisfaction derived from a relatively small increase in organizational trust is similar to the satisfaction derived from receiving a significant pay increase for employees. Conversely, if a similar amount of trust is lost, the decline in employee job satisfaction may resemble taking a comparable pay cut. Organizational sociology studies further suggest empowering members to contribute in more meaningful ways may stimulate innovation.

Organizational trust is a multi-faceted concept, however. Organizations are based on hierarchical structures of various types. Trust levels within an organization depend on relationships and interactions between individuals of different hierarchical levels and/or same hierarchical levels. Thus, improvement of trust within an organization, or in other words autonomy and empowerment of the members, relies on improving interactions, influencing positive behaviors, and discouraging negative behaviors in concrete ways, which in turn may lead to increased levels of innovation and member happiness.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a system for monitoring, analyzing, and influencing organizational behaviors through multi-modal communication systems. Action plans may be developed upon determining behaviors and organizational context. The behaviors may then be monitored through communication sessions between members and analyzed for comparison to action plans such that feedback (e.g. in form of scores) may be provided at individual and/or organizational levels to influence the behaviors.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
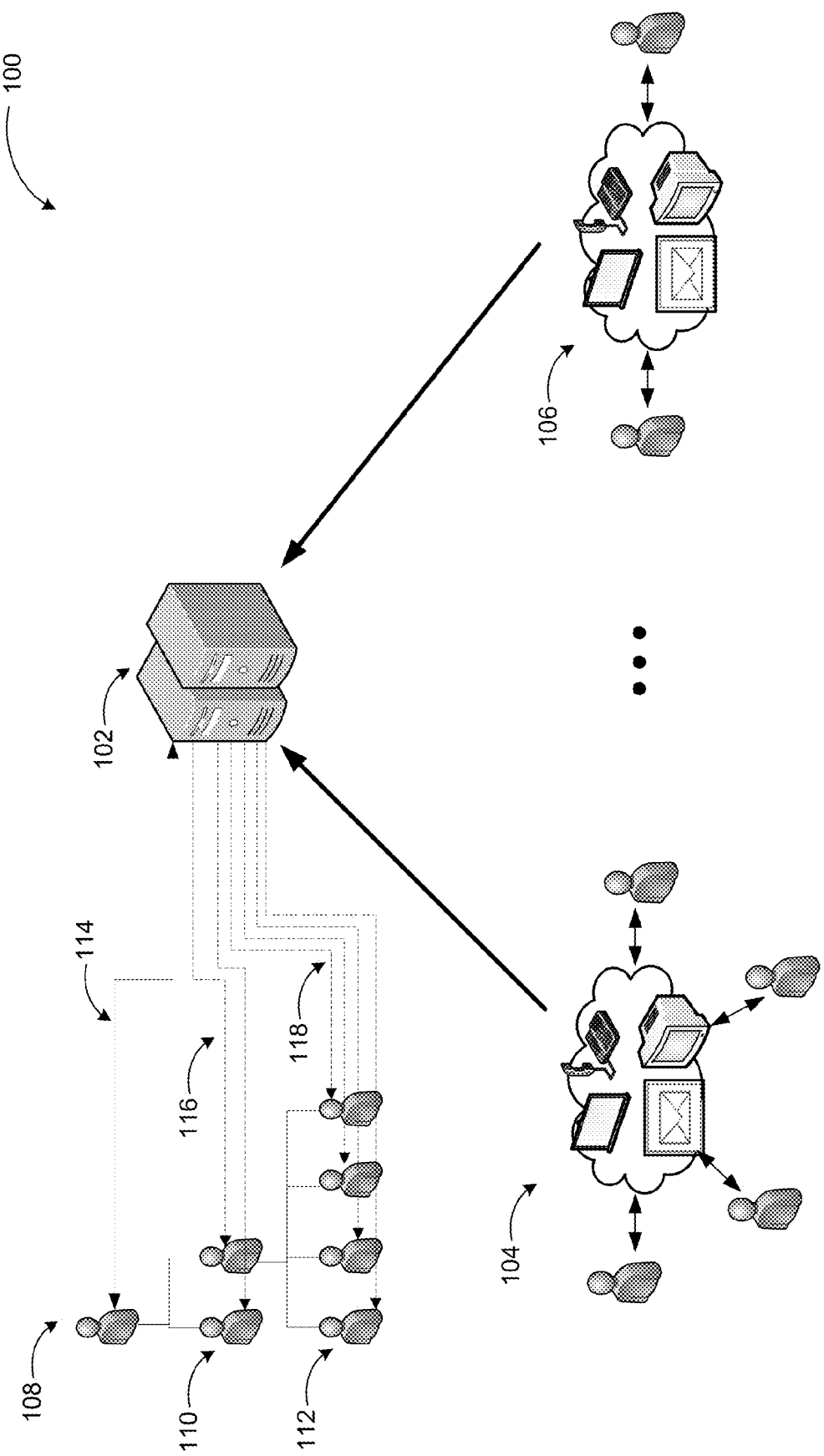
FIG. 1 is a conceptual diagram illustrating an organizational communication environment where monitoring and analysis of behaviors over multi-modal communications according to embodiments may be employed.

As briefly described above, organizational behaviors may be monitored, analyzed, and influenced via multi-modal communication sessions. Desired and undesired behaviors and applicable organizational contexts may be defined and action plans developed. The behaviors may then be monitored through communication sessions between members and analyzed for comparison to the action plans such that feedback may be provided at individual and/or organizational levels to influence the behaviors. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing computer and network operations, which may facilitate multi-modal communications in conjunction with a behavior monitoring, analysis, and influencing system. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes conceptual diagram 100 illustrating an organizational communication environment, where monitoring and analysis of behaviors over multi-modal communications according to embodiments may be employed. The networked communication environments shown in diagram 100 are for illustration purposes. Embodiments may be implemented in various networked environments such as enterprise-based networks, cloud-based networks, and combinations of those.

Diagram 100 represents example multi-modal communication environments that may be implemented within an organization such as a business enterprise. Organizations typically have a hierarchical structure among their members (e.g. multi-tiered supervisor-supervisee relations) represented by hierarchy levels 108, 110, and 112. A networked communication system managed by one or more servers 102 may facilitate multi-modal communications (104, 106) between the members of the organization at various times. The communications may be voice calls, video calls, email exchanges, instant message exchanges, whiteboard sharing sessions, data sharing sessions, and similar ones. Furthermore, the communications may be between two members (e.g. 106) or between multiple members (e.g. 104), for example video conferences, online presentations, group instant messaging conversations, and the like.

Thus, these multi-modal conversations represent a portion of member interactions for any organization. To improve organizational coherence, performance, innovativeness, and/or trust, a system according to some embodiments may be implemented in conjunction with the communication service(s) managed by servers 102. As discussed in more detail below, desired and/or undesired behaviors, contexts for these behaviors, and action plans to influence these behaviors may be defined. The communications may be monitored and analyzed for the defined behaviors. Subsequently, analysis results (e.g. in form of scores) may be provided to individual members (114, 116, 118) for self evaluation and improvement. Alternatively, organization level scores may be determined to measure progress.

The communication systems may include distinct networked systems for individual modalities such as Voice over IP (VOIP) systems, text exchange systems and technologies and video conferencing systems. The communication systems may also include enhanced systems such as unified communication networks, where one or more services may manage multiple modalities for in-network as well as out-of-network communications. As such, the communication systems may employ a number of servers such as communication servers, audio/video servers, database servers, presence servers, communications appliances and comparable ones. Members of the organization may participate in conversations through a number of end point devices such as laptop computers, netbooks, handheld computers, desktop computers, vehicle mount computers, smart phones, cellular phones, and similar ones. Moreover, one or more networks of the same or different type may be utilized in facilitating the communications and monitoring behaviors.

The example system in FIG. 1 has been described with specific servers, client devices, applications, and interactions. Embodiments are not limited to systems according to these example configurations. A platform providing organizational behavior monitoring, analysis, and influence may be implemented in configurations employing fewer or additional components and performing other tasks. Furthermore, specific protocols and/or interfaces may be implemented in a similar manner using the principles described herein.

Figure 2:
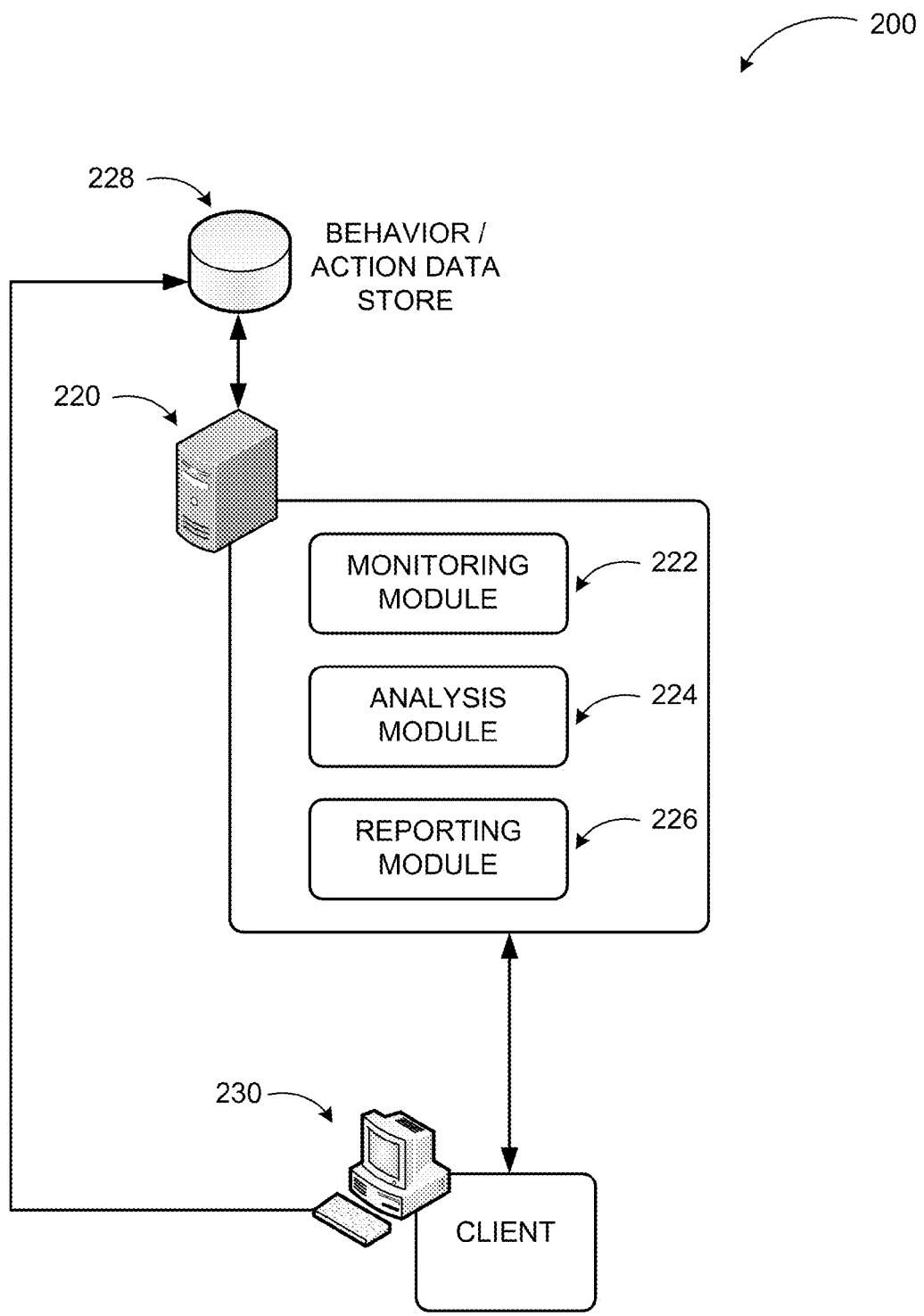
FIG. 2 illustrates example components of a system for monitoring, analyzing, and reporting behaviors in multi-modal communication sessions.

FIG. 2 illustrates example components of a system for monitoring, analyzing, and reporting behaviors in multi-modal communication sessions. While a system according to embodiments may comprise a number of centralized or distributed components and client-only solutions, relevant ones are included in diagram 200 for illustration purposes.

A single application with multiple modules or a number of distinct applications forming a distributed behavior analysis and reporting service may be executed on one or more servers (220). While such an application/service may have various aspects associated with monitoring of multi-modal conversations, analysis, and reporting of analysis results, major tasks may be performed by a monitoring module 222, analysis module 224, and reporting module 226. As mentioned previously, desired/undesired behaviors, contexts, and action plans may be defined manually (e.g. through brainstorming sessions) or automatically and stored at a behavior/action data store 228. Monitoring module 222 may monitor member communications facilitated through a client device 230 and capture evidence of desired/undesired behaviors, patterns, etc. Analysis module 224 may analyze the usage within predefined contexts and compare to action plans for individuals. Analysis module 224 may further determine group or organizational level behaviors and progress (if action plans are in place). Analysis results may include detailed usage of specific behaviors, overall scores for individual communication sessions or over a specific period of time for individual members, groups, and/or entire organization. The analysis may also be pivoted on a person. For example, a member may monitor his/her behavior when they converse with a superior vs. a supervisee or a peer.

Reporting module 226 may facilitate presentation of analysis results to individuals, groups, and the organization. Reporting may be in form of displaying analysis results through a user interface of a generic application (e.g. a web page), as part of a communication application (e.g. a user interface of the unified communication application), or another application (e.g. a word processing application). Results may be provided to monitored individuals for self-evaluation, their supervisors, human resources personnel, and comparable designated people. At each level of presentation, the results may be individualized or presented as group results to protect privacy of members, compliance with ethical walls, or other forms of corporate compliance. To address privacy concerns, permissions may be defined for accessing and/or retaining the analysis results. Furthermore, individual members (or others) may be enabled to select which conversations should be subject to monitoring and which should not. For example, a member may define through a user interface at set-up time or at the beginning of each conversation, whether they want a particular conversation to be monitored and analyzed.

Members may also be enabled to provide action plans and add/delete/modify predefined behaviors at the behavior/action data store 228 through their client device 230. For example, the application displaying analysis results to a member may provide another user interface for specifying actions plans and modifying the list of behaviors to be monitored. System level defaults and rules may be established for defining to what extent the individuals can modify the action plans and behavior lists.

Figure 3:
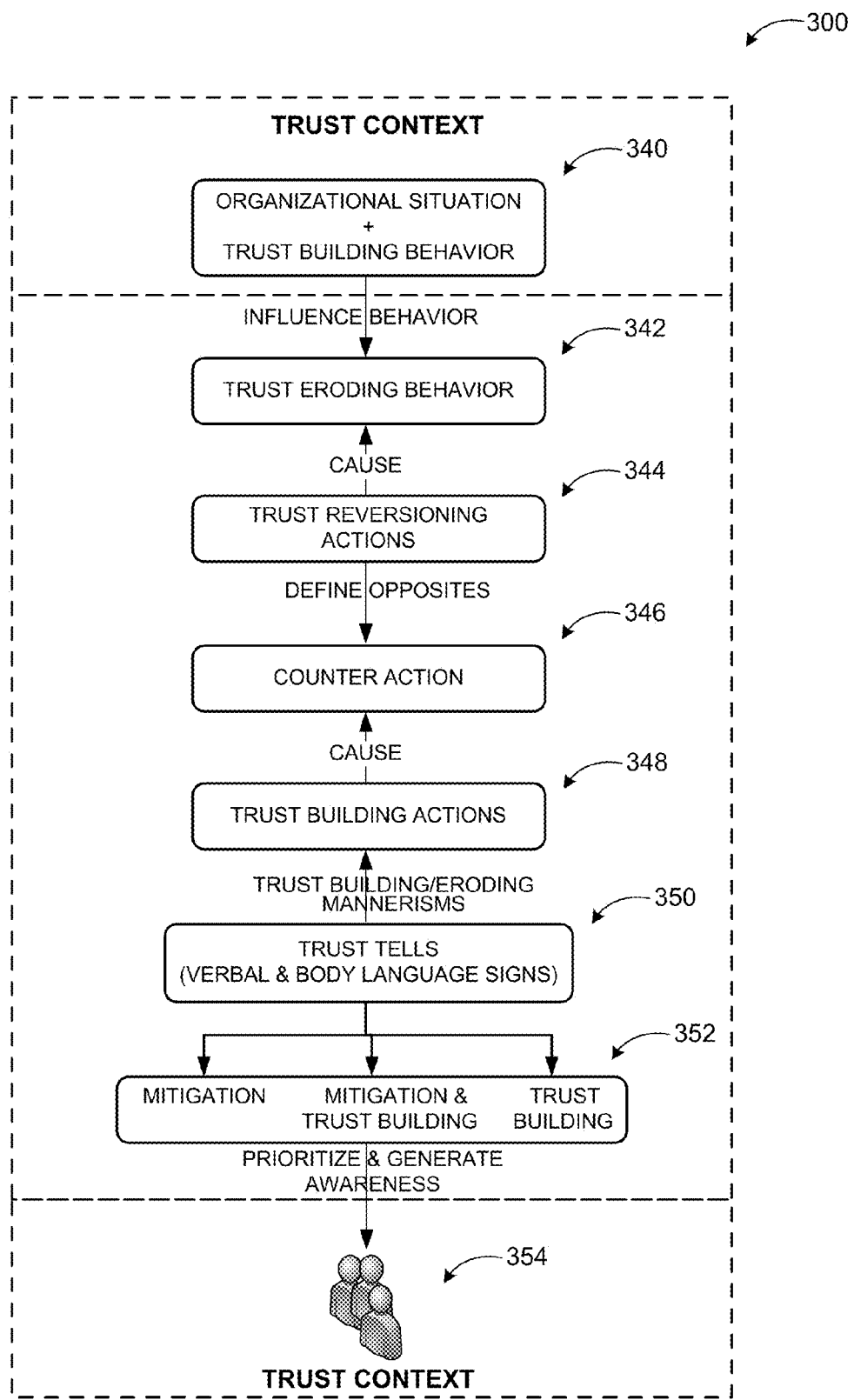
FIG. 3 illustrates an example flow of organizational analysis for behavior enhancement using trust as an example.

FIG. 3 illustrates an example flow of organizational analysis for behavior enhancement using trust as an example. Organizational behavior monitoring, analysis and influence approaches discussed herein may be employed for a variety of goals including, but not limited to, increased efficiency, increased participation, awareness of cultural practices, increased empowerment and engagement of employees, career growth, and trust improvement. Diagram 300 includes components in an example behavior analysis flow aimed at improving organizational trust levels as an example.

One aim of a behavior monitoring and analysis application according to embodiments is making trust-building behaviors more actionable. Thus, a desirable outcome may be influenced by establishing a target goal and then focusing on defining actions to reliably achieve that goal. By influencing actions opportunities to devise improvements may be exploited and used to promote, eliminate, or mitigate those actions. The result is improvement of the desirable goal, a reduced opportunity for the undesirable goal to occur, or both.

In any organizational/business situation, there are opportunities for influencing actions to occur that result in trust-eroding behaviors 342 (the opposite of trust-building behaviors), which may reduce organizational trust. The trust-eroding behaviors may be viewed as "organizational defects" and resolved through defect prevention techniques and analyses. A trust analysis system according to embodiments may also address pre-existing conditions reverting distrust to reestablish a climate of trust if necessary.

A trust improvement process may start with a specific business situation (e.g. a supervisor's relationships with his/her direct reports, a member's relationships with his/her supervisors or peers, situations like meetings, conference calls, etc.) and trust-building behaviors being defined (340) to improve organizational trust levels. Trust tells 350 (verbal phrases, gestures, mannerisms, patterns, etc.) may be used to detect and identify trust building actions 348. On the other hand, counter actions 346 to prevent or mitigate trust eroding behaviors 342 may be specified through trust reversioning actions 344.

Thus, trust eroding behaviors may be mitigated, trust building behaviors may be encouraged, or a combination of both may be applied (352) resulting in prioritization and generation of awareness. The overall improvement in trust building behavior within organizational situations may be referred to as trust context (354). Once the influencing actions are identified and agreed upon, language (or mannerisms) associated with the actions may be identified. For example, language or mannerisms (verbal and non-verbal actions) associated with a specific action in a business situation may be identified by a group of organization members in a brainstorming session or automatically by a machine learning algorithm. Trust building and eroding terms (verbal), gestures (non-verbal), or patterns may then be tracked in communication sessions between members of the organization. Feedback in form of analysis of the communication sessions or scores may alter the actions of individuals or the organization, and may result in reduced use of trust eroding behaviors while trust building behaviors may be encouraged.

Figure 4:
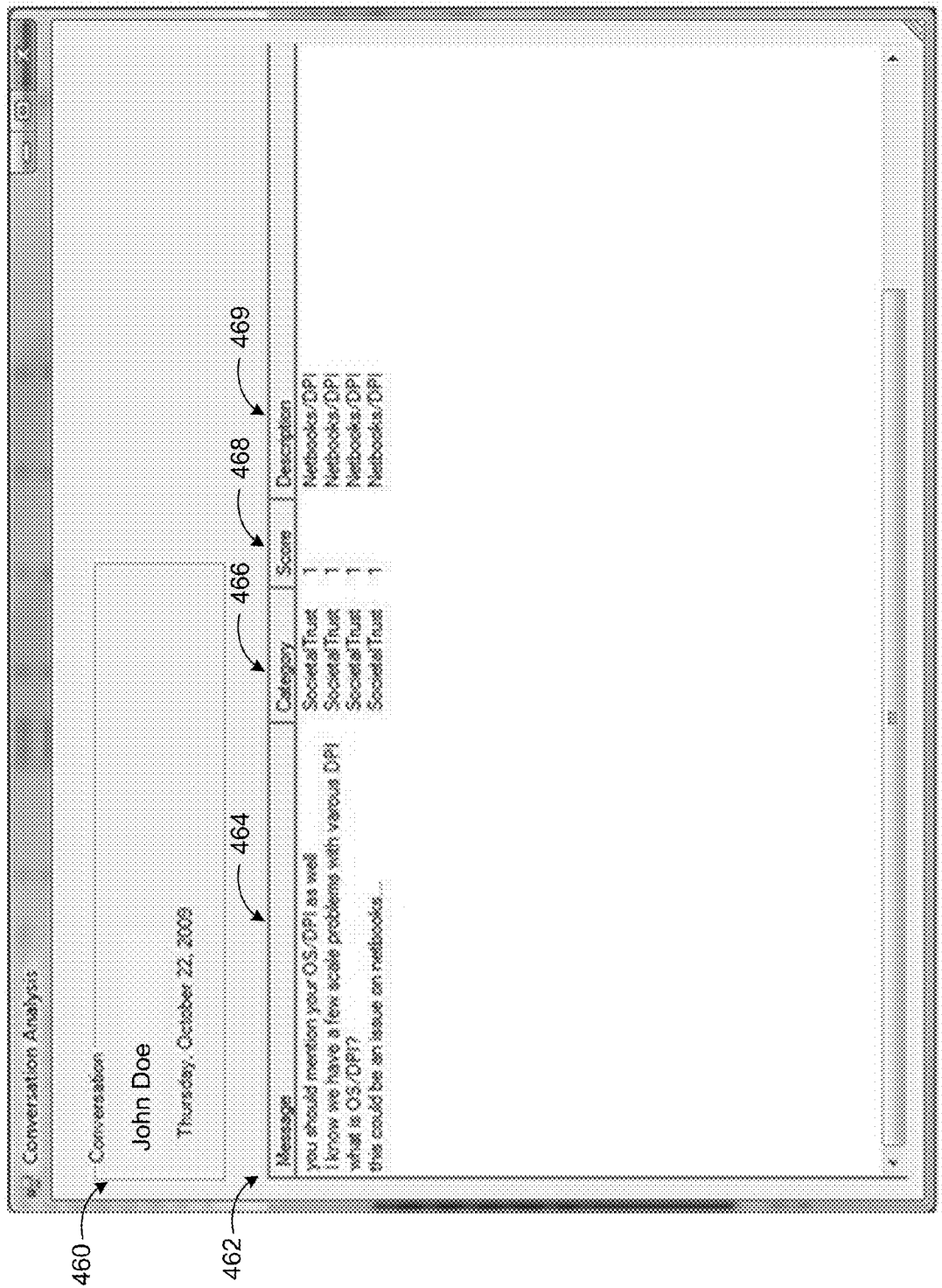
FIG. 4 illustrates an example screenshot of a interaction analysis display of a behavior monitoring and analysis application using text-based conversation as an example.

FIG. 4 illustrates an example screenshot of a interaction analysis display of a behavior monitoring and analysis application using text-based conversation as an example. As mentioned previously, analysis results of monitoring communications between organization members may be provided to the communicating members for self-evaluation. Screenshot 400 is an illustrative example of how detailed analysis results may be provided to a member.

The user interface of the application displaying the results may identify the member and a date/time of the conversation (460). Additional identifying information about the conversation such as modality, duration, participants, etc. may also be provided. Analysis results 462 may include detected phrases 464 indicating defined behaviors, category of the behaviors 466 (e.g. societal trust), a score 468 for each detected phrase, a description of the context 469, and comparable information. The analysis may detect "actions" and "tells" as well. Behaviors are the response of an individual or group to an action, environment, person or stimulus. Tells identify when an action is occurring and can be used to detect the actions. While the example screenshot reflects results from an email or voice conversation, other forms of interaction such as gestures, mannerisms, etc. in a video conference may also be analyzed and reported (e.g. nodding one's head in agreement, shaking one's head indicating disagreement, hand gestures, and similar ones). Additionally, patterns of communication may also be detected (in addition to distinct phrases or mannerisms). For example, cutting off others during conversation, prolonged monologues, and comparable ones may be included in the category of behaviors to be discouraged. Similarly, a time of day, or day of week of initiating a conversation and likewise patterns may be of interest to the analysis (e.g. a supervisor calling his supervisees frequently during after hours or at lunch time, or when they are busy may not recognize that habit until shown by the application). The patterns may also be pivoted on the relationship. If an individual calls a direct report during lunch, it can have a stronger negative impact on the score than if they call a peer (though they both may be construed as negative and have a negative score impact). The application may aggregate individual patterns anonymously into organizational patterns.

A user interface displaying analysis results may employ a variety of textual, graphical, color, shading, and comparable schemes to emphasize different aspects of the results. For example, negative behaviors may be presented in one color (or with a suitable icon) while positive behaviors may be presented in another color (or with a different icon). Results may also be filtered based on behavior attributes. Moreover, controls may be provided on the user interface to enable the user access a behavior/action data store and modify their action plan, add behaviors to the list to be monitored, etc. Additionally, the ability to perform real time analysis may be provided through the user interface.

Figure 5:
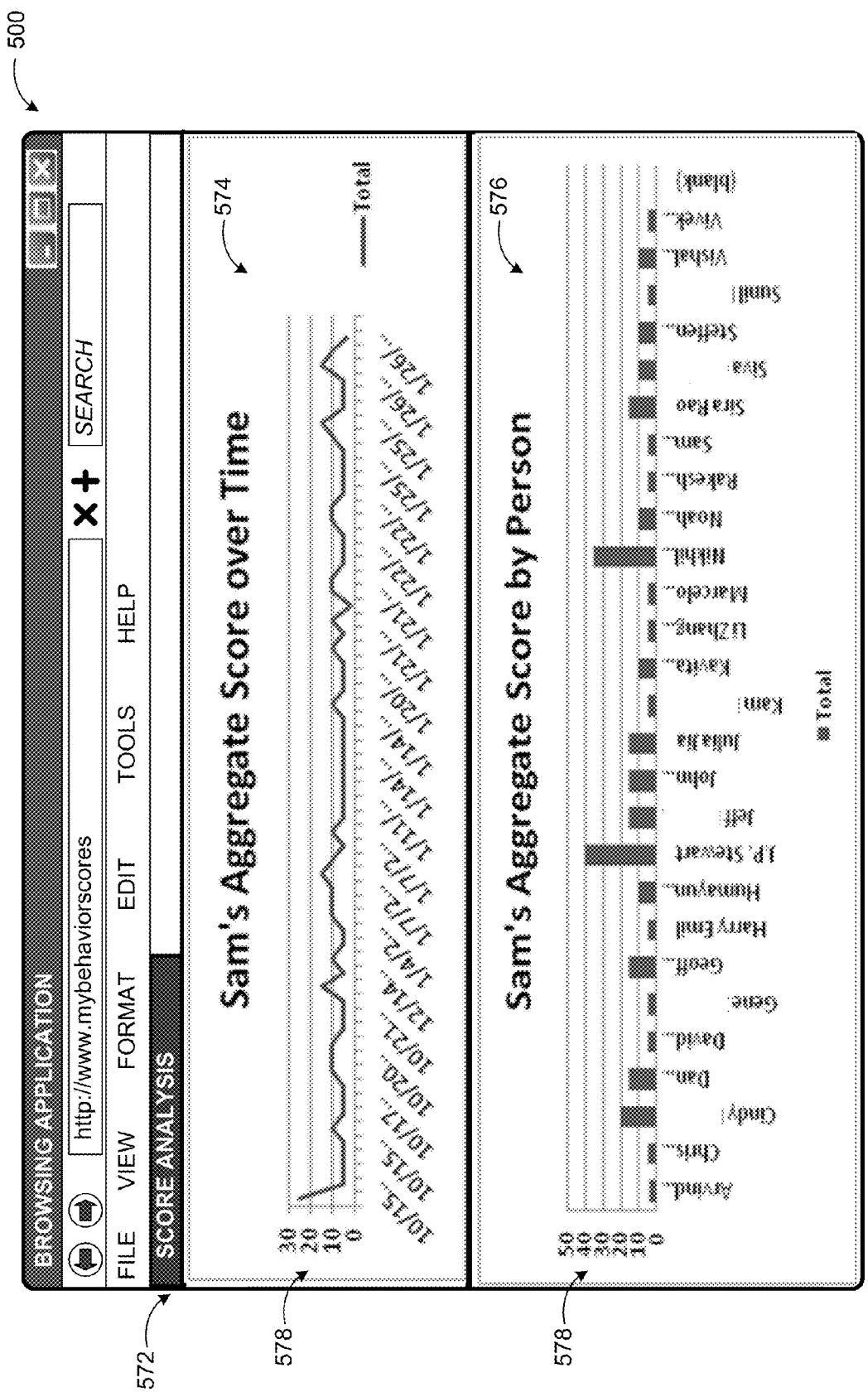
FIG. 5 illustrates an example screenshot of a score display of a behavior monitoring and analysis application.

FIG. 5 illustrates an example screenshot 500 of a score display of a behavior monitoring and analysis application. Scores are a simplified and user friendly method of providing analysis results. A behavior monitoring and analysis application may present scores to individual users through a custom user interface or through a generic application user interface such as a web page presented by a browsing application as shown in screenshot 500.

The presented information on the web page is identified as score analysis 572 and includes two different presentations. The aggregate score over time 574 may be a representation of the member's (Sam) scores in various conversations over time. Aggregate score by person 576 is a display of the same member's scores for conversations with other members of the organization. The scores may be presented on a predefined scale 578. The score may be computed based on addition and deletion of points assigned to specific behaviors. For further detail and accuracy, the behaviors may be weighted individually. The weights may be further adjusted based on context and/or cultural considerations. For example, certain phrases or mannerisms may be valued more in one culture and others may be more offensive in other cultures. Thus, a system according to embodiments may be customized based on a geographic region, cultural background of members, demographics, etc.

As discussed above, scores may be computed based on phrases, as well as gestures, mannerisms, and patterns. Mannerisms may include visual cues such as wearing dark glasses in a video conference, wearing unacceptable clothing to a business meeting, and similar ones. Individual scores may be aggregated anonymously for predefined groups within an organization and/or for the entire organization indicating behavior patterns as well as progress if action plans are defined for the groups/organization.

According to some embodiments, rules may be defined in an organizational behavior monitoring and influence system. A rule is the software definition of how a behavior is detected in communication. Rules may be defined in an XML schema that includes following elements:
   a. Rule Name—e.g. Positive Affirmations
   b. Rule Description—friendly description e.g. Encouraging Positive Affirmations
   c. Score Impact—If this rule is met, how does it affect the score? e.g. 5
   d. Rule Description via Clauses. Examples:
   i. MESSAGE contains "thanks"
   ii. OR MESSAGE contains "great job!"
   iii. OR MESSAGE contains "nice job"
   e. Message clauses may consist of the various items claimed
   iv. MESSAGE (text in the message)
   v. LOCATION (location of the user at the time of communication)
   vi. TIMESTAMP (time of day at the time of communication)
   vii. RELATIONSHIP (relationship between the participants)
   viii. MODALITY (communication modality user (text, audio/video, etc.))

Rules may be shared among peers and uploaded to the server to provide a trust "Body of Knowledge". A user may be enabled to select certain rules to monitor, or an administrator may enforce that certain rules are used. The user may import rules from the server into their local store or create a rule and upload it to the server. A rule may start as experimental, and eventually be moved to production. Rules may be rated and voted upon in order to determine their usefulness and whether they are ready for production. Furthermore, an enterprise may define its own rules. Rules may also be obtained from the cloud.

The examples in FIGS. 4 and 5 have been described with specific user interface elements, configurations, and presentations. Embodiments are not limited to systems according to these example configurations. Behavior monitoring and analysis may be implemented in configurations using other types of user interface elements, score computations, and configurations in a similar manner using the principles described herein. For example, analysis results (i.e. score) may be displayed using any textual, numeric, alphanumeric or graphical technique to help facilitate the interpretation of the results and their meaning.

Figure 6:
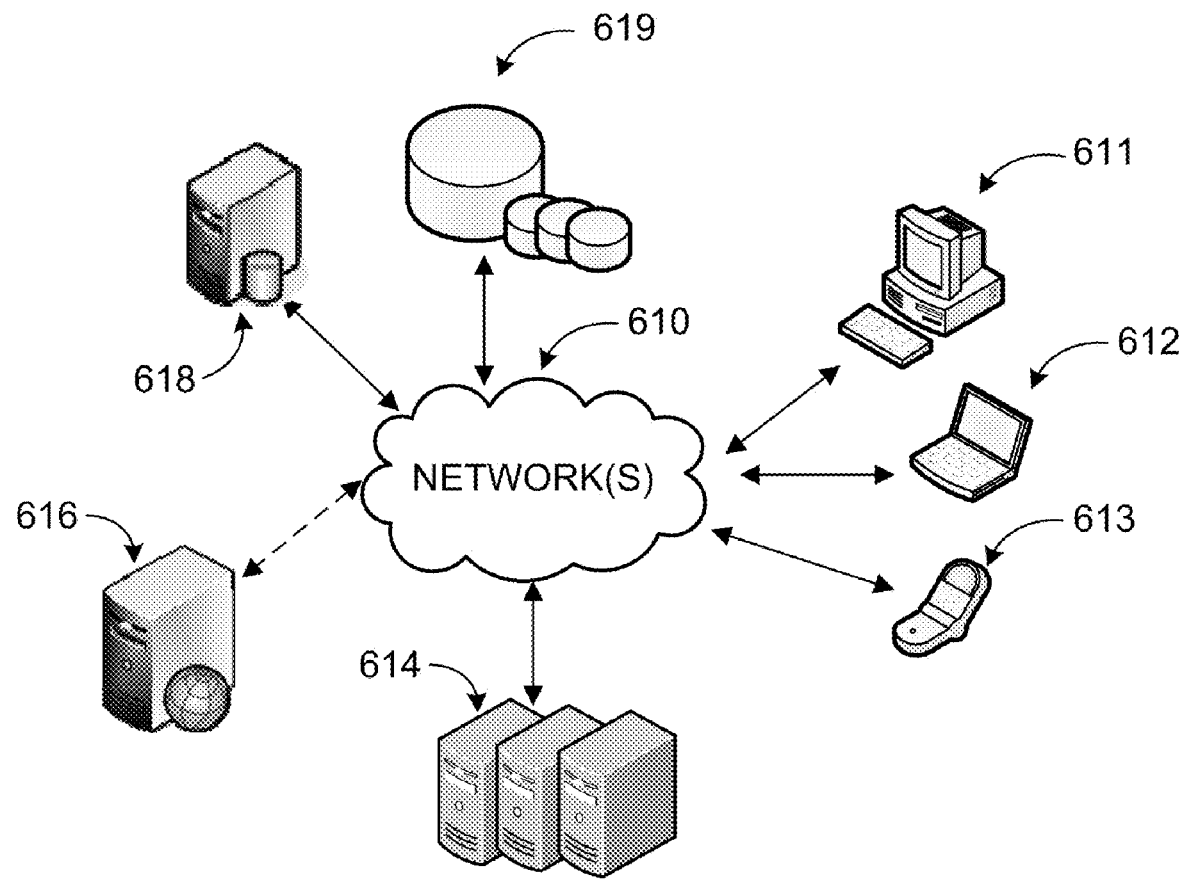
FIG. 6 is a networked environment, where a system according to embodiments may be implemented.

FIG. 6 is an example networked environment, where embodiments may be implemented. An organizational behavior monitoring, analysis, and influence system may be implemented via software executed over one or more servers 614 such as a hosted service. The platform may communicate with client applications on individual computing devices such as a smart phone 613, a laptop computer (or netbook) 612, or desktop computer 611 (client devices') through network(s) 610.

Client applications executed on any of the client devices 611-613 may facilitate multi-modal communications via communication application(s) executed by servers 614, or on individual server 616. A behavior application executed on one of the servers may facilitate specification of desired/undesired behaviors, organizational contexts, and action plans. The application may then monitor applicable communications between individuals, analyze behaviors during the communication sessions, and provide feedback at the individual or organizational levels as discussed previously. The behavior application may retrieve relevant data from data store(s) 619 directly or through database server 618, and provide requested services (e.g. document editing) to the user(s) through client devices 611-613.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to implement a platform providing organizational behavior monitoring and modification services. Furthermore, the networked environments discussed in FIG. 6 are for illustration purposes only. Embodiments are not limited to the example applications, modules, or processes.

Figure 7:
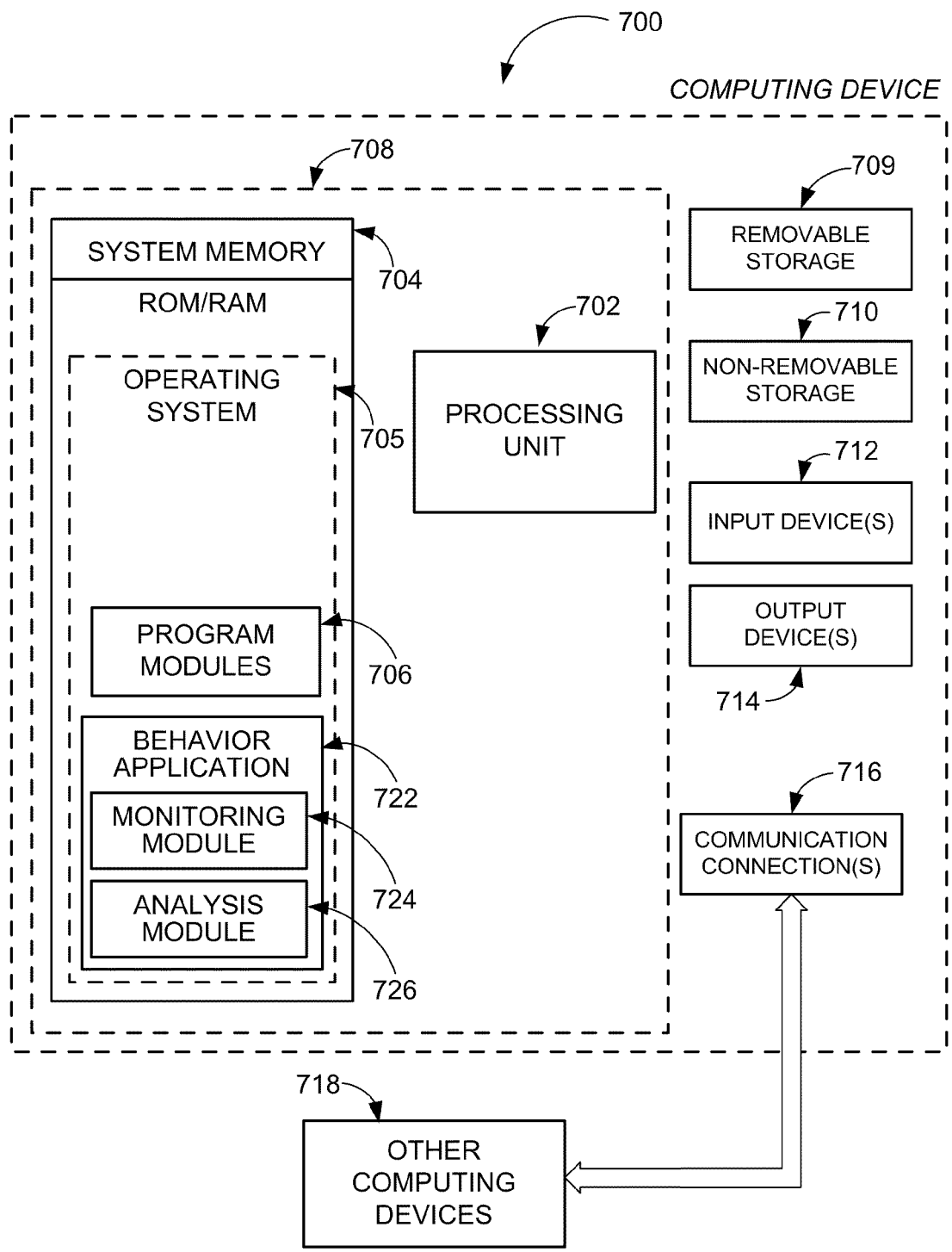
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may be a server executing a behavior application capable of monitoring, analyzing, and reporting organizational behaviors during communication sessions according to embodiments and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® operating systems from MICROSOFT CORPORATION of Redmond, Wash. The system memory 704 may also include one or more software applications such as program modules 706, behavior application 722, monitoring module 724, and analysis module 726.

Behavior application 722 may enable administrators or select users to define desired/undesired behaviors (e.g. for improvement of organizational trust levels), specify context (s), and develop action plans. Through the monitoring module 724, behavior application 722 may monitor communications between individuals. Analysis module 726 may analyze defined behaviors and provide feedback to the monitored individuals or other designated people. Moreover, behavior application 722 may match monitored members based on behavior patterns for staffing purposes. Behavior application 722, monitoring module 724, and analysis module 726 may be separate applications or an integral component of a hosted service. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, video input device, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wired or wireless network in a distributed computing environment, a satellite link, a cellular link, a short range network, and comparable mechanisms. Other devices 718 may include computer device(s) that execute communication applications, web servers, and comparable devices. Communication connection(s) 716 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
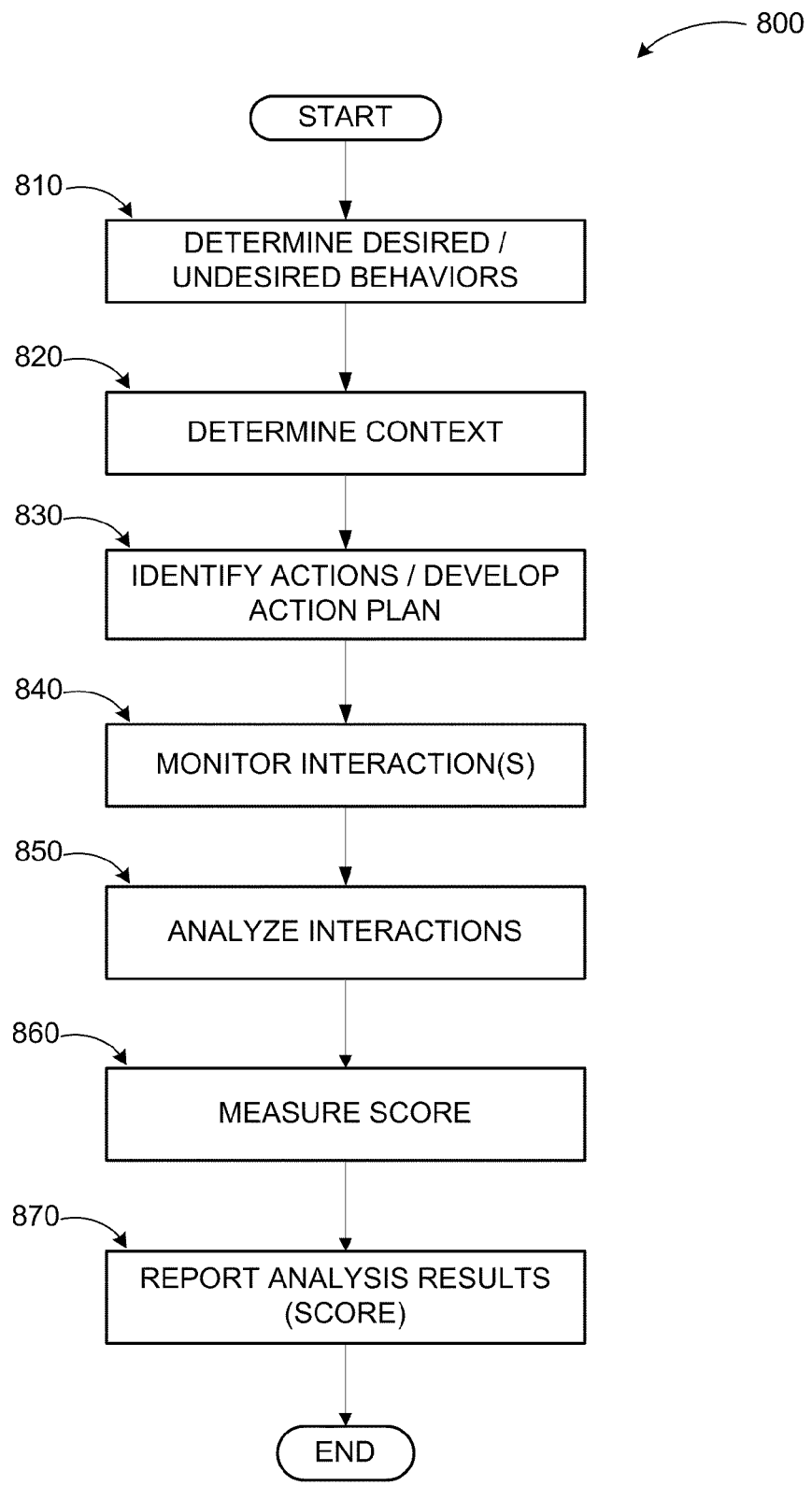
FIG. 8 illustrates a logic flow diagram for a process of behavior monitoring and analysis according to embodiments.

FIG. 8 illustrates a logic flow diagram for process 800 of behavior monitoring and analysis according to embodiments. Process 800 may be implemented as part of an enterprise level application executed on a server.

Process 800 begins with operation 810, where desired and/or undesired behaviors for a particular organizational goal (e.g. improvement of trust, increased participation, increased innovation, etc.) are defined. The behaviors may be defined manually (through a brainstorming session) or automatically by a machine learning algorithm, etc. At operation 820, one or more organizational contexts may be determined. The contexts may include situations such as supervisor-supervisee communications, peer-to-peer communications, presentations to groups, and comparable ones.

At operation 830, actions for influencing desired/undesired behaviors within the determined contexts may be identified and/or action plans developed. For example, specific language phrases or mannerisms that are desirable or undesirable may be defined for a particular context (e.g. supervisor-supervisee communications). Interactions between individuals may be monitored at operation 840. The monitored communication sessions may include one-to-one sessions or one-to-many sessions. Use of desired or undesired behaviors may be recorded for each communication session.

At operation 850, the monitored interactions may be analyzed. Utilization of identified actions may be examined within the context of the communication sessions. According to some embodiments, the analysis may lead to measurement of a score at operation 860 for a simplified presentation of analysis results. A predefined scale may be used to indicate a frequency of desired and undesired behaviors. Furthermore, the scores may be weighted based on factors such as geographic region, cultural background, type of communication session, context, and comparable ones.

Analysis results (e.g. scores) may be reported to monitored individuals, their supervisors, or similar designated people at operation 870. Reporting may be in form of displaying scores and other analysis results through a user interface, printing, or storing at a predefined location. According to further embodiments, a system may monitor an individual's behavior and use factors from the individual's calendar, email, past practices, etc. to prioritize and predict that individual's behavior, and/or enable the individual to simulate, practice, or train. For example, a first person's score may be consistently lower if a certain second person attends a meeting with the first person, or when the first person is under schedule pressure. The system may track and/or flag these situations and provide the first person additional guidance and/or training/simulation opportunities.

The operations included in process 800 are for illustration purposes. Behavior monitoring and analysis may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed on a computing device for monitoring, analyzing, and influencing organizational behavior at a processor of the computing device, the method comprising:

determining desired and undesired behaviors at the processor;

determining an organizational context comprising at least one from a set of: a supervisor-supervisee interaction, a supervisee-supervisor interaction, and a peer-to-peer interaction at the processor;
identifying actions associated with the desired and undesired behaviors within the organizational context at the processor;
monitoring communication sessions of at least one modality to detect identified actions at the processor;
tracking trust building and eroding behaviors from the desired and undesired behaviors including at least one from a set of: terms, gestures, and patterns in the communication sessions at the processor;
analyzing detected actions at the processor;
computing a score reflecting frequency of use of the detected actions associated with desired and undesired behaviors;
aggregating the score anonymously for at least one from a set of: a predefined group within an organization and the entire organization for an indication of behavior patterns and progress for defined action plans for the group and the organization;
including feedback in analysis results to alter the actions to one of: a reduction in the trust eroding behaviors and an encouragement of trust building behaviors at the processor; and
providing the analysis results and the score to one of: monitored members of the organization, a supervisor of the monitored members, and a designated member of the organization from the processor such that desired behaviors are encouraged and undesired behaviors are discouraged.

2. The method of claim 1, further comprising:
receiving an action plan from a monitored member of the organization at the processor;
comparing the detected actions to the action plan at the processor; and
providing a progress report to the member based on the comparison from the processor.

3. The method of claim 1, wherein at least one modality of the communication sessions includes one of: an audio communication, a video communication, a text-based communication, a whiteboard sharing session, a data sharing session, and an online presentation session.

4. The method of claim 1, wherein the actions include at least one from a set of: a verbal phrase, a gesture, a mannerism, and a pattern of behavior.

5. The method of claim 1, wherein the monitored communication sessions include one-to-one sessions, one-to-many sessions, and many-to-many sessions.

6. The method of claim 1, wherein the analysis results include one of: the score computed over time, the score computed for each interacted member of the organization, and the score computed for each communication session.

7. The method of claim 1, wherein the score is weighted based on at least one from a set of: a geographic region of monitored members of the organization, a cultural background, a type of communication sessions, and a context of interactions between the members of the organization.

8. The method of claim 1, wherein the desired and undesired behaviors are determined to enhance at least one from a set of: an organizational coherence, an organizational performance, an organizational innovativeness, and an organizational trust.

9. A system for monitoring, analyzing, and influencing organizational behavior through multi-modal communications, the system comprising:
a first server for facilitating communication sessions in at least one modality;
a second server for executing a behavior application, wherein the behavior application is configured to:
determine desired and undesired behaviors for enhancing at least one organizational aspect;
determine an organizational context comprising at least one from a set of: a supervisor-supervisee interaction, a supervisee-supervisor interaction, and a peer-to-peer interaction;
identify actions associated with the desired and undesired behaviors within the organizational context;
monitor the communication sessions of at least one modality facilitated by the first server to detect identified actions;
track trust building and eroding behaviors from the desired and undesired behaviors including at least one from a set of: terms, gestures, and patterns in the communication sessions;
analyze detected actions;
compute a score reflecting frequency of use of the detected actions associated with desired and undesired behaviors;
aggregate the score anonymously for at least one from a set of: a predefined group within an organization and the entire organization for an indication of behavior patterns and progress for defined action plans for the group and the organization;
include feedback in analysis results to alter the actions to one of: a reduction in the trust eroding behaviors and an encouragement of trust building behaviors; and
provide the analysis results and the score to one of: monitored members of the organization, a supervisor of the monitored members, and a designated member of the organization such that desired behaviors are encouraged and undesired behaviors are discouraged.

10. The system of claim 9, further comprising:
a data store for storing predefined desired and undesired behaviors and the action plans for members.

11. The system of claim 10, wherein the behavior application is further configured to enable the monitored members to perform at least one from a set of: adding, deleting, and modifying desired and undesired behaviors, and the action plans at the data store.

12. The system of claim 9, wherein the behavior application is further configured to match monitored members based on the behavior patterns for staffing purposes.

13. The system of claim 9, wherein the behavior application is further configured to:
predict the monitored member's behavior based on at least one from a set of: the monitored behavior, the member's calendar, and the member's past practices; and
provide a practice opportunity by generating a simulated situation.

14. The system of claim 13, wherein the score is displayed through one of: a user interface of a browsing application and a user interface of a communication application executed by the first server.

* * * * *